United States Patent

[11] 3,596,579

| [72] | Inventors | John F. Coughlin;<br>Ralph I. Berge, both of Binghamton, N.Y. |
|---|---|---|
| [21] | Appl. No. | 836,378 |
| [22] | Filed | June 25, 1969 |
| [45] | Patented | Aug. 3, 1971 |
| [73] | Assignee | GAF Corporation<br>New York, N.Y. |

[54] EXPOSURE CONTROL AND LOW-LIGHT WARNING SYSTEM
8 Claims, 1 Drawing Fig.

[52] U.S. Cl. .................................................... 95/10,
95/64, 250/214, 356/226
[51] Int. Cl. ........................................... G01j 1/44,
G03b 17/18, G03b 19/18
[50] Field of Search............................................. 95/10 C,
64; 250/214; 356/218, 226

[56] References Cited
UNITED STATES PATENTS

| 3,430,053 | 2/1969 | Westhauer .................... | 250/214 |
| 3,452,656 | 7/1969 | Ruhle et al..................... | 95/10 C |
| 3,455,227 | 7/1969 | Sato et al. ..................... | 95/64 |
| 3,476,028 | 11/1969 | Namba et al.................. | 95/10 C X |

FOREIGN PATENTS

| 1,544,256 | 9/1968 | France |

Primary Examiner—Samuel S. Matthews
Assistant Examiner—Joseph F. Peters, Jr.
Attorneys—Walter C. Kehm and Martin Smolowitz ABSTRACT: A bridge is connected across the terminals of a low voltage camera battery through a voltage-dropping resistor. The four arms of the bridge contain, reading clockwise from the positive terminal thereof, 1) a plurality of diodes leading to one null terminal, 2) single diode leading to the negative terminal, 3) a balancing resistor leading to the other null terminal, and 4) a photocell leading to such positive terminal. The central crossarm contains an exposure control galvanometer and an adjustable resistor in series between the null terminals. A low-light warning lamp circuit is connectable across the battery by a switch and is provided with a Darlington transistor circuit having its base connected through a resistor to the null terminal leading to the photocell for limiting current to such base and isolating the galvanometer circuit from the Darlington transistor circuit. Thus, in operation, changes in the battery voltage result in only a very slight change in current through the galvanometer at a single light level, while the Darlington transistor circuit provides a high gain resulting in the turn "ON" point of the low-light warning lamp to be sharply defined.

PATENTED AUG 3 1971
3,596,579
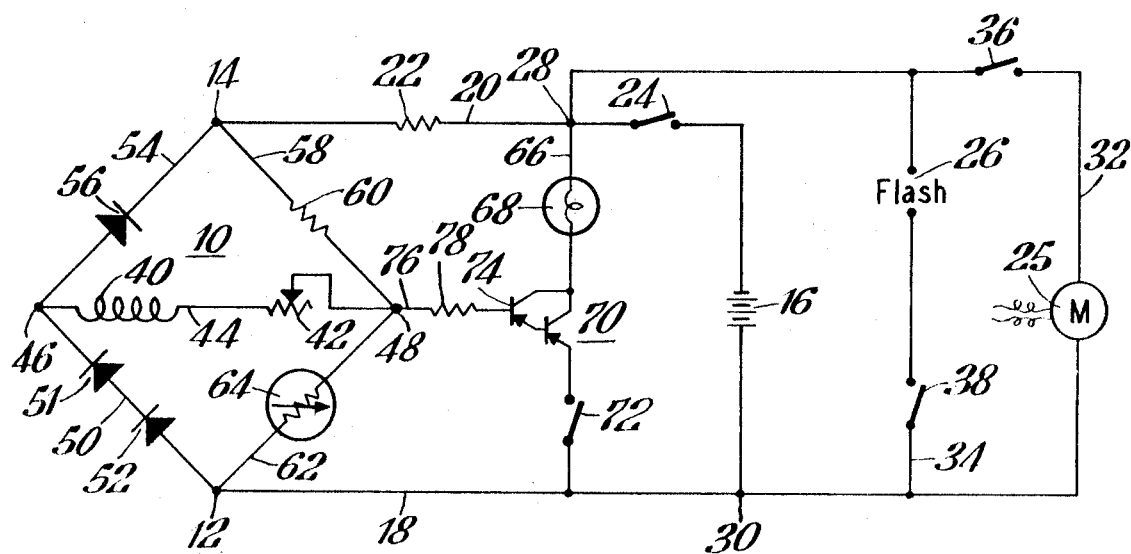
INVENTOR
John Francis Coughlin
Ralph Irving Berge
BY
Martin Smolowitz
ATTORNEY

EXPOSURE CONTROL AND LOW-LIGHT WARNING SYSTEM

This invention relates to exposure control and insufficient light warning circuits utilizing the small battery of one or more cells provided for operating a small motor and/or flash device thereof in hand camera for example.

ART PRIOR TO THE INVENTION

It has been proposed to use rectifiers in the form of glow discharge tubes as voltage regulators in "Electronic Circuit Analysis" in Air Force Manual, 52—8, Vol. I, pp. 4—30, copyrighted Nov. 1962; and in "Principals of Applied Electronics" by Ben Jeines, copyrighted 1963, John Wiley & Sons, Inc. pp. 345—346. It has also been proposed to use diodes as voltage regulators in "Transistor Circuit Design" by the Engineering Staff of Texas Instruments, Inc. pp. 145—148; copyrighted 1963 by McGraw Hill.

Furthermore, Ciemniak et al., U.S. Pat. No. 3,383,566, dated May 14, 1968, is concerned with diode control of voltage in an exposure control circuit for portable cameras operated by low voltage, low current batteries. The system proposed by such patent involves a plurality of parallel loops which contain 1) the battery and a plurality of silicon diodes in series; and 2) a photoresistor element and a galvanometer element, respectively, whereby the diodes maintain the essentially constant voltage level required in the second loop as the battery voltage decays in use. No low-light warning lamp circuit is involved. The patent does not claim voltage-regulating systems per se to be the invention and does not use a bridge. In obtaining their patent, the patentees freely admitted that "...silicon diodes are known for their applications as (voltage) regulation means for a load...."

SUMMARY OF INVENTION

According to the present invention, there is provided a novel stabilized voltage exposure control and insufficient light warning system comprising a bridge for the exposure control and a Darlington transistor circuit both connected across a single small camera battery and to a null terminal of the bridge to thereby provide a high gain which causes the low-light warning lamp to be sharply defined.

The invention provides, in addition, a low-cost, stable isolated voltage to power the exposure control apparatus, using the flash and/or camera motor battery of small cells. The invention eliminates any need for separate batteries to power the exposure control apparatus, as well as the need for a battery tester to monitor the condition of flash and/or motor battery and also decreases or eliminates changes in exposure control apparatus response as the flash and/or camera motor battery become weak with use or age.

A primary feature of the invention is the novel regulated voltage source in combination with a well-differentiated signal for warning the camera user that the light level is insufficient for normal photograph and that a flashcube or flashbulb is necessary.

BRIEF DESCRIPTION OF DRAWING

The single FIGURE (See Sketch B) of the drawing is a circuit diagram illustrative of the invention.

GENERAL DESCRIPTION OF INVENTION

As shown in the drawing, a wheatstone-type bridge 10 is connected through positive and negative DC terminals 12 and 14, respectively, to the corresponding terminals of a camera battery 16 consisting of three small cells by a lead 18 and a lead 20. The lead 20 contains a voltage-dropping resistor 22 and a switch 24 in series circuit relation. A camera motor 25, as well as a flash device 26 are connected to the battery, the battery circuit terminals 28 and 30 by circuits 32 and 34 containing switches 36 and 38, respectively.

Galvanometer coil 40 and an adjustable resistor 42 are connected in series in the central crossarm 44 of the bridge 10 between null terminals 46 and 48 thereof. Sidearm 50 connecting positive terminal 12 and null terminal 46 of the bridge contains a plurality, in this case, two diodes 51 and 52. Sidearm 54 connecting null and negative terminals 46 and 14 contains a single diode 56. Sidearm 58 connecting negative and null terminals 14 and 48 contains a balancing resistor 60. Finally, arm 62 connecting null and positive terminals 48 and 12 contains a photocell 64.

A low-light warning circuit 66 containing a lamp 68, a Darlington transistor circuit 70 and a switch 72 is also connected across the battery terminals 28 and 30. The base 74 of the Darlington transistor circuit 70 is connected to null terminal 48 of the bridge 10 by lead 76 containing resistor 78.

SPECIFIC EXAMPLE OF INVENTION

| Element | Size or Type |
| --- | --- |
| Resistor: | |
| 22 | ¼ watt. |
| 60 | Do. |
| 78 | Do. |
| 42 | Adjustable. |
| Diode: | |
| 51 | Rectifier. |
| 52 | Do. |
| 56 | Do. |
| Galvanometer (coil) 40 | Exposure control. |
| Photo cell 64 | Cadmium sulfide cell. |
| Darlington transistor circuit | Two PNP transistors connected in Darlington conf'n. |
| Lamp 68 | 2 volt. |
| Switch: | |
| 24 | SPST. |
| 36 | Do. |
| 38 | Do. |
| 72 | Do. |
| Battery 16 | 3 v. –2 cells/1.5 v. each. |

OPERATION

In operation, diodes 51, 52, and 56 stabilize the magnitude of the voltage across the bridge 10 when the supply voltage varies. Resistor 78 is a base current limiter and an isolation resistance, and closure of switch 72 completes the warning low-light circuit 66. Switch 24 applies power to the circuit when the camera is cocked, and switch 38 applies power to the flash 26 when the shutter (not shown) is tripped. Switches 24, 38, and 72 are mechanically designed into the camera.

The galvanometer coil 40 is connected across nulls 46 and 48 of the bridge 10 so that the balance between the sum of diode 56 and resistor 60; and the sum of diodes 51 and 52 and photocell 64 determine the current through such galvanometer coil 40. Resistor 42 is adjusted to compensate for resistance differences in galvanometer coils or other exposure control devices used in the circuit 44. Resistor 22 acts to hold the current steady through diodes 51, 52, and 56.

The use of two PNP transistors 72 and 74 in a Darlington configuration provides high gain enabling the turn on point of the low-light warning lamp 68 to be sharply defined. The first transistor 72 acts as emitter follower, so that the second transistor 74 receives a higher base signal current by a factor of the current gain of the first transistor (beta). A single Darlington transistor may be used for the same purpose. Also the circuit may employ any suitable photovoltic cell in place of photocell 64.

TABLES

Test results using a light source with a color temperature of 4,700 K. are shown in the following tables:

L1 CURRENT CHARACTERISTICS.—CURRENT THROUGH L1 WITH A CHANGE IN SUPPLY VOLTAGE

| Light level | Supply voltage | | | |
| --- | --- | --- | --- | --- |
| | 3 volts | 2.5 volts | 1.9 volts | |
| 0.0 FL | 0 | 0 | 0 | Current through galvanometer. |
| 215.78 FL | 27 ua | 25 ua | 20 ua | |
| 863.14 FL | 236 ua | 225 ua | 196 ua | |
| 0.0 FL | 0 | 0 | 0 | Galvanometer rotation. |
| 215.78 FL | 17 degrees | 15 degrees | 15 degrees | |
| 836.14 FL | 67 degrees | 70 degrees | 65 degrees | |

PARAMETER CHARACTERISTICS.—CIRCUIT TESTED
WITH 2.5 VOLTS APPLIED

Photocell Resistance, Voltage and Current

| | | | |
|---|---|---|---|
| Low light....... 215.78 FL... | R=4,600Ω | E=1.32 v. | I=270 ua. |
| High light....... 863.14 FL... | R=1,400Ω | E=.78 v. | I=645 ua. |

TRANSISTOR PNP DARLINGTON CIRCUIT

| | I base. ua. | I collector. ma. | E collector base. v. | I emitter. ma. |
|---|---|---|---|---|
| EV 10........ 26.97 FL | 30 | 48 | .95 | 47.5 |
| EV 12........ 215.78 FL | 0.0 | 10 | 2.6 | 8 |
| EV 14........ 863.14 FL | 0.0 | 0.0 | 2.7 | 0 |

LOW LIGHT WARNING LAMP

| | Current, ma. | Voltage |
|---|---|---|
| 26.97 FL............... | 48. | 1.85 |
| 215.78 FL............... | 10 | .085 |
| 863.14 FL............... | 0.0 | 0.0 |

As pointed out above, the foregoing tests were made using a light source with a color temperature of 4,700 K. with current resistance and voltage measurements being taken from 215.78 FL to 863.14 FL (ASA 64, ev. 12—ev. 14).

Note in the L1 Current Characteristics that a change in supply voltage from 3.0 to 1.9 volts results in only a very slight change in the current through the galvanometer or other exposure-controlling device at a single light level. This means that at any single light level within a designed range, a change in supply voltage from 3.0 to 1.9 volts causes little or no exposure change on film.

For convenience only, a cadmium sulfide photocell was used, Darlington transistor configuration, and a grain of wheat lamp with characteristics as noted in the Parameter Characteristics. Components of other values (parameters) can be used by slightly changing the values of the other components in the circuit.

Also for convenience, the equivalent value of two, —1.5 volt cells was used. However, this circuit will regulate the current through the galvanometer, or other exposure-controlling device, at any supply voltage by changing the values of the circuit components.

The test setup used a galvanometer for exposure control. This invention, however, will supply a stable voltage for any type exposure control device including electronic shutter.

Advantages of the invention include:
1. Considerable savings in battery replacement by virtue of the fact that the batteries are useable for their full lives.
2. Stable and well-regulated voltage source for the control devices.
3. Well-defined lighting of low-light warning lamp.
4. On a single battery of small cells is needed as the source of power for each camera or other instrument with which the invention is used.

What we claim is:
1. An exposure control and low-light warning system comprising, in combination:
   a bridge having positive and negative terminals connected to a battery through a voltage-dropping resistor, said bridge having null terminals to which a crossarm containing an exposure control device and an adjustable resistor is connected, the two sidearms of said bridge between said positive terminal and the null terminals containing a plurality of diodes and a light-sensitive cell, respectively, and the remaining two sidearms containing a diode and a balancing resistor, respectively; and
   a low-light warning signal circuit connected to the terminals of such battery through a Darlington transistor circuit the base of which is connected through an isolating resistor to the bridge null terminal to which the photocell, cross and balancing resistor arms are commonly connected.
2. The invention as defined by claim 1, in which the exposure control device is a galvanometer, the light-sensitive cell comprises cadmium sulfide and the circuits of the bridge and low-light warning signal are connected to the battery by SPST switches.
3. The invention as defined by claim 1, in which the low-light warning signal is a lamp the "ON" brightness of which is intensified by said Darlington transistor circuit.
4. The invention as defined by claim 3, in which the battery also powers other devices including a motor and a flash device.
5. A low-light warning indicator for a camera exposure control system comprising, in combination:
   a bridge for connection to the camera battery through a voltage-reducing resistor,
   said bridge consisting of four sidearms and a central crossarm,
   said central crossarm containing a galvanometer and an adjustable resistor in series circuit relation between null terminals of the bridge,
   the sidearm between one null terminal and the negative terminal of the bridge consisting of a diode rectifier,
   the sidearm between said negative terminal and the other null terminal consisting of a balancing resistor,
   the sidearm between said one null terminal and the positive terminal of said bridge consisting of two diode rectifiers in series circuit relation, and
   the sidearm between said positive terminal and said second null terminal consisting of a photocell; and
   a low-light warning lamp circuit connectable across said battery, comprising a Darlington PNP transistor, the base of which is connected through a resistor to one null terminal of said bridge and the output of which controls the ON-OFF lighting energization of the lamp to be sharply defined when the lamp circuit is connected to the battery by a switch.
6. The invention as defined by claim 5, in which a camera flash circuit is also connectable across the battery for energization thereby.
7. The invention as defined by claim 5, in which a camera motor circuit is also connectable across the battery for energization thereby.
8. The invention as defined by claim 5, wherein the galvanometer indicates any current difference between the sum of the single diode-resistor arm current and the single resistor arm current, and that of the two-series connected diode rectifier arm and the photocell arm currents.

Disclaimer

3,596,579.—*John F. Coughlin* and *Ralph I. Berge,* Binghamton, N.Y. EXPOSURE CONTROL AND LOW-LIGHT WARNING SYSTEM. Patent dated Aug. 3, 1971. Disclaimer filed Sept. 30, 1982, by the assignee, *Eastman Kodak Co.*

Hereby enters this disclaimer to all claims of said patent.
[*Official Gazette February 8, 1983.*]